(12) United States Patent
Hayamizu et al.

(10) Patent No.: US 8,505,338 B2
(45) Date of Patent: *Aug. 13, 2013

(54) METHOD FOR MANUFACTURING LOWER MOLD, METHOD FOR MANUFACTURING GLASS GOB, AND METHOD FOR MANUFACTURING MOLDED GLASS ARTICLE

(75) Inventors: Shunichi Hayamizu, Amagasaki (JP); Naoyuki Fukumoto, Amagasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 648 days.

This patent is subject to a terminal disclaimer.

(21) Appl. No.: 12/452,912

(22) PCT Filed: Jul. 22, 2008

(86) PCT No.: PCT/JP2008/063114
§ 371 (c)(1),
(2), (4) Date: Jan. 27, 2010

(87) PCT Pub. No.: WO2009/016993
PCT Pub. Date: Feb. 5, 2009

(65) Prior Publication Data
US 2010/0126220 A1    May 27, 2010

(30) Foreign Application Priority Data

Aug. 1, 2007  (JP) ................................. 2007-200603
Nov. 19, 2007 (JP) ................................. 2007-299033

(51) Int. Cl.
C03B 11/00    (2006.01)

(52) U.S. Cl.
USPC ............................... 65/66; 65/374.12; 65/305

(58) Field of Classification Search
USPC ............................................................. 65/66
See application file for complete search history.

(56) References Cited

U.S. PATENT DOCUMENTS 4,139,443 A * 2/1979 Sakurai .................... 204/192.29
4,725,375 A * 2/1988 Fujii et al. .................... 252/79.4
(Continued)

FOREIGN PATENT DOCUMENTS

EP    0 379 597 A1    8/1990
JP    03-016923       1/1991
(Continued)

OTHER PUBLICATIONS

The First Office Action issued by the State Intellectual Property Office of People's Republic of China, mailed on Mar. 20, 2012, for Application No. 200880100842.4, 5 pages, and corresponding English Translation, 8 pages.
International Search Report in International Application No. PCT/JP2008/063114, dated Oct. 28, 2008, 2 pages.

*Primary Examiner* — Joseph S Del Sole
*Assistant Examiner* — Erin Snelting
(74) *Attorney, Agent, or Firm* — Brinks Hofer Gilson & Lione

(57) ABSTRACT

In one aspect, there is provided a process for manufacturing a lower mold for receiving a falling molten glass droplet, in which without narrowing the option for material for a lower mold, any occurrence of air retention can be favorably prevented and a lower mold excelling in durability can be obtained. The process comprises the film forming step of forming a coating layer on a base material and the surface roughening step of roughening the surface of the coating layer. Preferably, the coating layer contains at least one element selected from among chromium, aluminum and titanium.

12 Claims, 11 Drawing Sheets

(56) References Cited

U.S. PATENT DOCUMENTS

| | | | |
|---|---|---|---|
| 5,037,515 A * | 8/1991 | Tsai et al. | 204/192.15 |
| 5,223,350 A | 6/1993 | Kobayashi et al. | |
| 5,662,999 A * | 9/1997 | Taniguchi et al. | 428/408 |
| 5,762,676 A * | 6/1998 | Richards et al. | 65/102 |
| 5,876,478 A * | 3/1999 | Imamura et al. | 65/374.11 |
| 8,365,554 B2 * | 2/2013 | Fukumoto et al. | 65/66 |
| 2003/0143858 A1 * | 7/2003 | Mathuni et al. | 438/710 |
| 2005/0186332 A1 | 8/2005 | Funada et al. | |
| 2006/0037363 A1 * | 2/2006 | Wang | 65/374.11 |
| 2006/0130522 A1 * | 6/2006 | Fukumoto et al. | 65/24 |

FOREIGN PATENT DOCUMENTS

| | | |
|---|---|---|
| JP | 03-083824 | 4/1991 |
| JP | 03-137031 A | 6/1991 |
| JP | 08-133762 A | 5/1996 |
| JP | 08-217470 A | 8/1996 |
| JP | 2002-154834 | 5/2002 |
| JP | 2005-235318 A | 9/2005 |
| JP | 2005-272187 | 10/2005 |
| JP | 2007-185831 A | 7/2007 |
| WO | WO 90/00528 A1 | 1/1990 |
| WO | WO 2009/016993 A1 | 2/2009 |

* cited by examiner

FIG. 4a
FIG. 4b
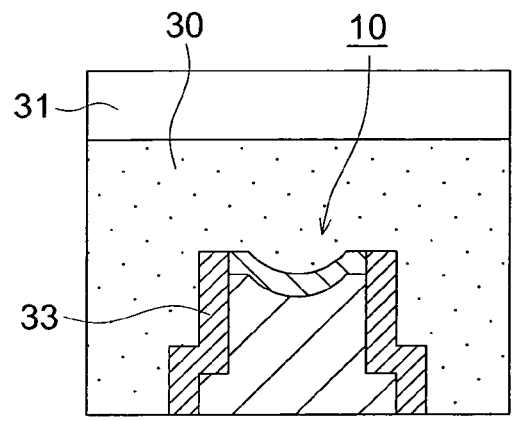
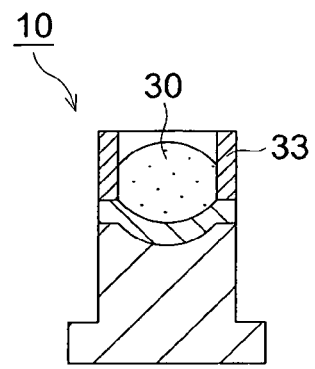
FIG. 5
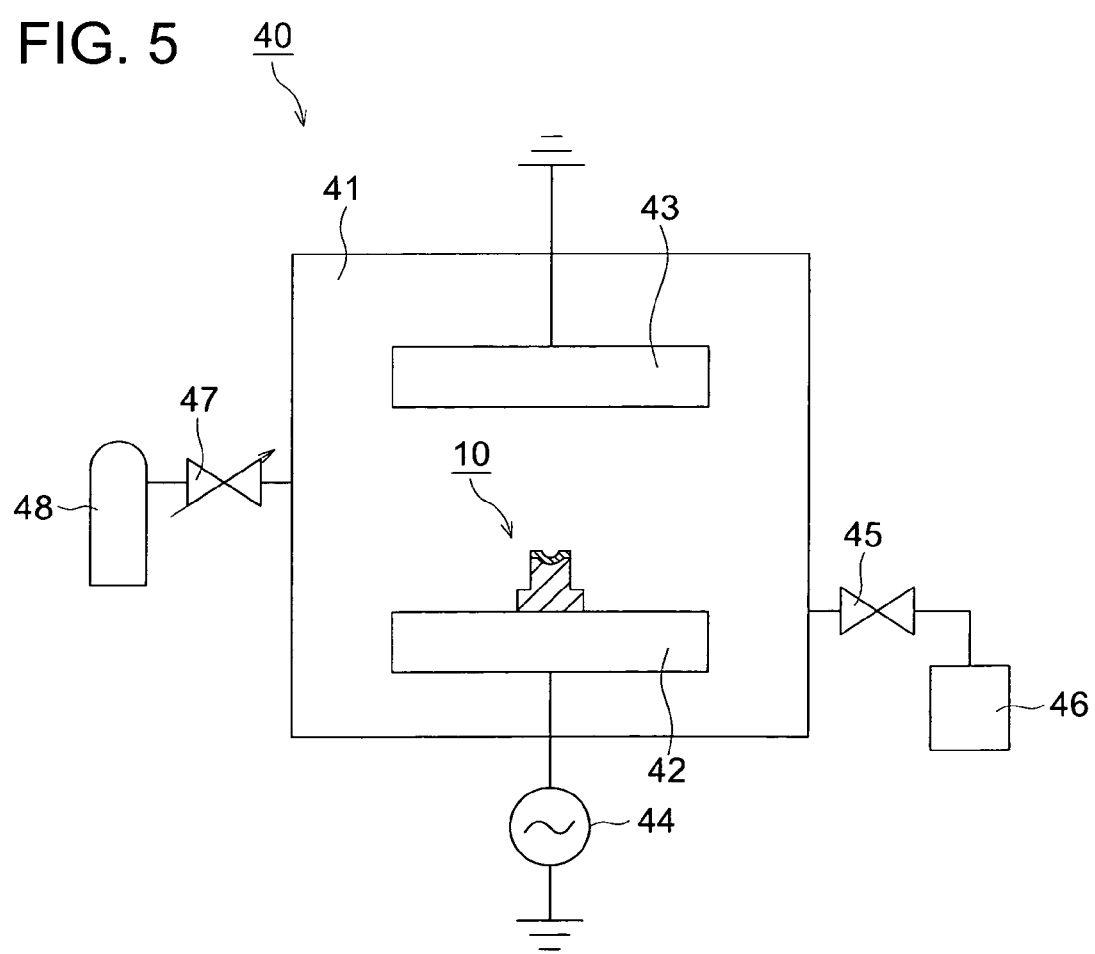

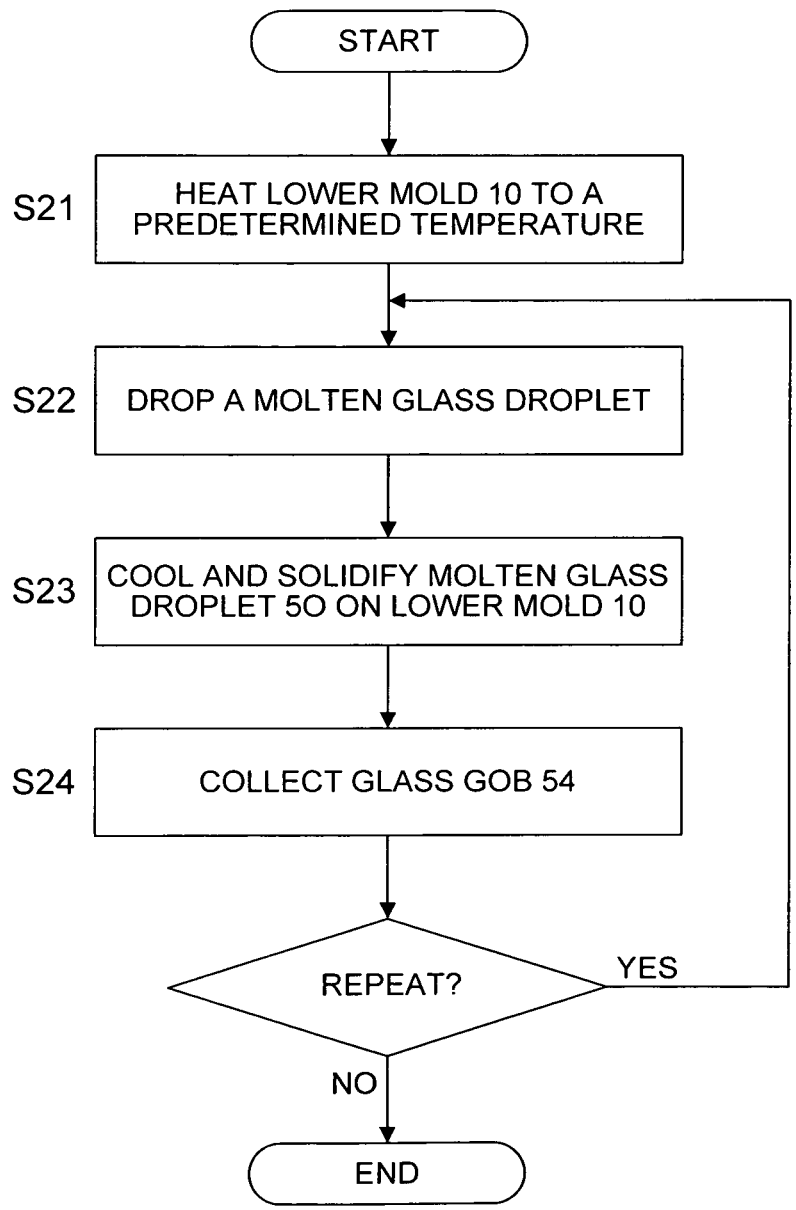

FIG. 9
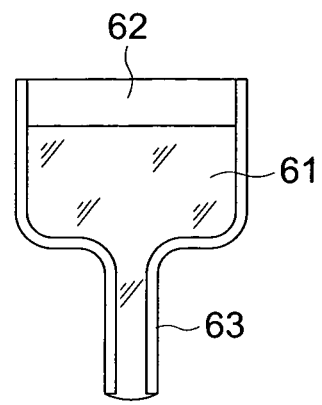
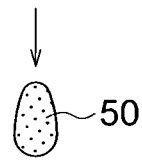
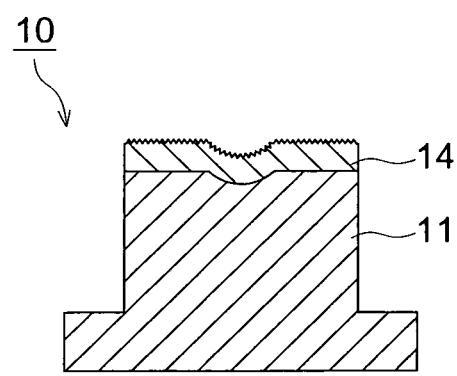

FIG. 10
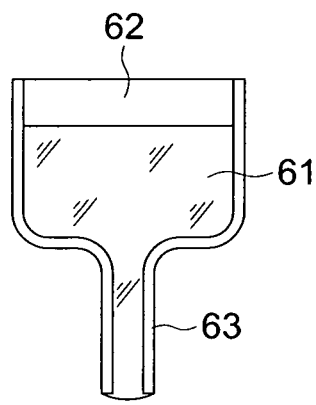
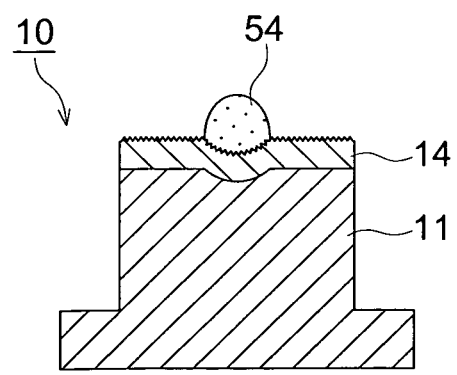

and a coupling lens for optical communication. As such glass optical elements, molded glass articles formed by press-molding glass material in a metal mold are frequently used.
METHOD FOR MANUFACTURING LOWER MOLD, METHOD FOR MANUFACTURING GLASS GOB, AND METHOD FOR MANUFACTURING MOLDED GLASS ARTICLE This application is a National Stage of International Application PCT/JP2008/063114 filed with Japanese Patent Office on Jul. 22, 2008.

TECHNICAL FIELD

The present invention relates to a method for manufacturing a lower mold for receiving a molten glass droplet, a method for manufacturing a glass gob and that for manufacturing a molded glass article each using the lower mold.

BACKGROUND ART

Recently, glass optical elements are widely used as a lens for digital cameras, a pickup lens for DVD, a lens for portable telephone cameras and a coupling lens for optical communication. As such glass optical elements, molded glass articles formed by press-molding glass material in a metal mold are frequently used.

One of production methods for such molded glass articles is known, in which method a glass pre-form having a predetermined weight and shape is made and the glass pre-form is heated together with a metal mold to a temperature, at which the glass becomes deformable, and pressed to be shaped (hereinafter also referred to as re-heat press method).

Conventionally, the glass pre-form to be used for the re-heat press method has been produced often by a mechanical process such as grinding and polishing. However, the method using grinding and polishing causes a problem that the method needs considerable labor and time. Therefore, a method is investigated in which molten glass is dropped onto a lower mold and cooled and solidified on the lower mold to prepare a glass pre-form without any mechanical processing.

Besides, another method is proposed in which a molten glass droplet is dropped onto a lower mold heated at a predetermined temperature and the molten glass droplet is shaped by pressing using the lower mold and an upper mold facing the lower mold to obtain a molded glass article (hereinafter referred to as droplet shaping method). This method is noted because the molten glass can be directly shaped from the molten glass droplet without repetition of heating and cooling of the metal mold so that the time necessary for whole molding can be considerably shortened.

However, when a glass droplet is dropped on the lower mold, a fine dent is formed, by hitting with the lower mold, near the central portion of the surface (contacting with the lower mold) of the glass droplet. Air in the dent has no escape route and is confined until the glass is cooled and solidified so that there is caused a problem that a dent (air retention) remains on the bottom surface of the glass pre-form or the molded glass article.

As a countermeasure to such a problem, a method for preventing the remaining of the air retention is proposed, in which the surface of the lower mold is roughened ($R_{max}$ of from 0.05 μm to 0.2 μm) so save the escaping rout for the air enclosed in the dent (for example, Patent Document 1).

Moreover, a lower mold is proposed, in which a coating layer containing a meltable layer is provided on the roughened base (Ra of from 0.005 μm to 0.05 μm) to prevent air from being retained and to make it easily recycled (for example, Patent Document 2).

Patent Document 1: Japanese Laid-Open Patent Application Publication No. H03-137031
Patent Document 2: Japanese Patent Application Patent Application No. 2005-272187

DISCLOSURE OF INVENTION

Object of the Invention

If the method described in Patent Document 1 or 2 is used to prevent the air retention to be created, it is necessary to roughen the surface of the lower mold to have a predetermined roughness by a method such as etching.

There are various conditions on the material to be used for the metal mold for molding glass, and the conditions are exemplified as follows: the material is difficultly made react with the glass at high temperature; a mirror surface can be obtained; the material can be easily processed; and the material is high in the hardness and low in the brittleness. The materials satisfying such conditions are very few, and an ultra hard material mainly constituted by tungsten carbide, a ceramic material such as silicon carbide and silicon nitride and a composite material are preferably used.

However, it is often difficult to uniformly roughen at a predetermined roughness such materials that have preferable properties for the metal mold. Alternatively, in the case of ultra hard material mainly composed of tungsten carbide, for example, its surface can be roughened by etching, but the formed roughened surface is very brittle and the durability is considerably low.

Therefore, there is the following problem: the methods described in Patent Documents 1 and 2 cannot be utilized; or if they are utilized, a stable production cannot be performed since the durability is not good.

The invention is conceived based on the above background, and an object of the invention is to provide a process for manufacturing a lower mold for receiving a dropping molten glass droplet, which mold suitably prevents the occurrence of air retention without limiting options in lower mold materials and has good durability. Another object of the invention is to provide a method for stably producing glass gob having no air retention and a method for producing a molded glass article having no air retention.

Means for Solving the Object

In order to solve the objects, the present invention has the following features.

Item 1. A method for manufacturing a lower mold for receiving a dropping molten glass droplet, the method comprising the steps of:

depositing a coating layer on a substrate, the coating layer including an element selected from the group consisting of chromium, aluminum, and titanium; and roughening a surface of the coating layer by etching to make a roughened surface.

Item 2. The method for manufacturing a lower mold of Item 1, wherein the etching is wet etching using acidic solution containing cerium(IV) ammonium nitrate.

Item 3. The method for manufacturing a lower mold of Item 1, wherein the etching is wet etching using alkaline solution containing potassium ferricyanide and potassium hydrate.

Item 4. The method for manufacturing a lower mold of Item 1, wherein the etching is dry etching using plasma.

Item 5. The method for manufacturing a lower mold of any one of Items 1 to 4, wherein the coating layer contains chromium element.

Item 6. The method for manufacturing a lower mold of any one of Items 1 to 5, wherein the roughened surface of the coating layer has an arithmetic average roughness Ra of 0.01 µm or more and an average length of roughness curve element RSm of 0.5 µm or less.

Item 7. The method for manufacturing a lower mold of Item 6, wherein the arithmetic average roughness Ra of the roughened surface of the coating layer is 0.2 µm or less.

Item 8. A method for manufacturing a lower mold for receiving a dropping molten glass droplet, the method comprising the steps of:

depositing a coating layer on a substrate; and roughening a surface of the coating layer to make a roughened surface, wherein the roughened surface of the coating layer has an arithmetic average roughness Ra of 0.01 µm or more and an average length of roughness curve element RSm of 0.5 µm or less.

Item 9. The method for manufacturing a lower mold of Item 8, wherein the arithmetic average roughness Ra of the roughened surface of the coating layer is 0.2 µm or less.

Item 10. A method for manufacturing a glass gob, the method comprising the steps of:

dropping a molten glass droplet on a lower mold; and cooling and solidifying the dropped molten glass droplet on the lower mold, wherein the lower mold is manufactured by the method for manufacturing a lower mold of any one of claims 1 to 9.

Item 11. A method for manufacturing a molded glass article, the method comprising the steps of:

dropping a molten glass droplet on a lower mold; and press-molding the dropped molten glass droplet by using the lower mold and an upper mold facing the lower mold, wherein the lower mold is manufactured by the method for manufacturing a lower mold of any one of claims 1 to 9.

Advantage of the Invention

According to the invention, the surface of the lower mold can be uniformly roughened to a predetermined roughness regardless of the material of the substrate since the surface of a coating layer provided on the substrate of the lower mold is roughened, and whereby the substrate is not deteriorated. Consequently, the occurrence of air retention can be suitably prevented and the lower mold excellent in durability can be produced without limiting options of the material for the lower mold. Moreover, a glass gob and a molded glass article having no air retention therein can be stably produced by using the lower mold manufactured by the production method of the invention.

BRIEF DESCRIPTION OF THE DRAWINGS

FIGS. 4*a* and 4*b* are diagrams showing methods of etching using a mask;

FIG. 5 is a diagram showing an example of a parallel plate type dry etching apparatus;

FIG. 8 is a diagram showing an example of a production method of a glass gob;

FIG. 9 is a diagram showing a step (S22) for dropping a glass droplet onto a lower mold;

FIG. 10 shows a drawing showing a step (S23) for cooling and solidifying the dropped glass droplet on the lower mold;

| NUMERALS | |
|---|---|
| 10: | Lower mold |
| 11: | Substrate |
| 14: | Coating layer |
| 15: | Molding surface |
| 30: | Etchant |
| 31: | Etchant tank |
| 33: | Mask |
| 40: | Dry etching apparatus |
| 41: | Vacuum chamber |
| 42, 43: | Electrode |
| 50: | Molten glass droplet |
| 51: | Dent |
| 52: | Bottom surface |
| 53: | Space |
| 54: | Glass gob |
| 55: | Molded glass article |
| 60: | Upper mold |
| 63: | Nozzle |

BEST MODE FOR CARRYING OUT THE INVENTION

The embodiments of the invention are described in detail below referring to FIGS. 1*a* to 13.

Figure 1A:
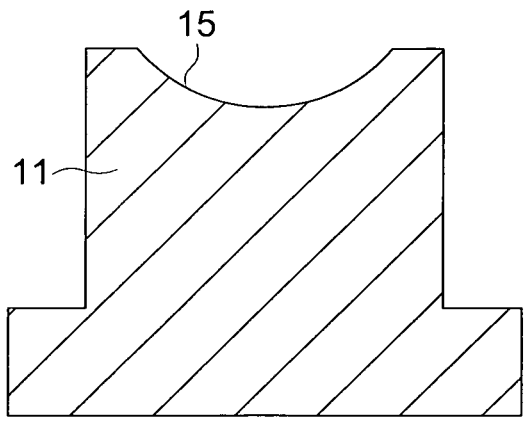
FIGS. 1*a*, 1*b*, and 1*c* show cross section views when the lower mold is in respective steps.
Figure 1B:
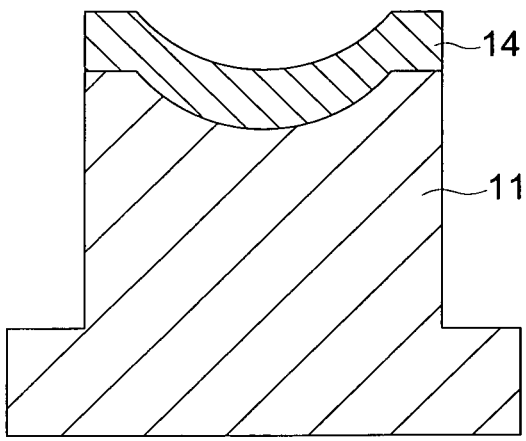
Figure 1C:
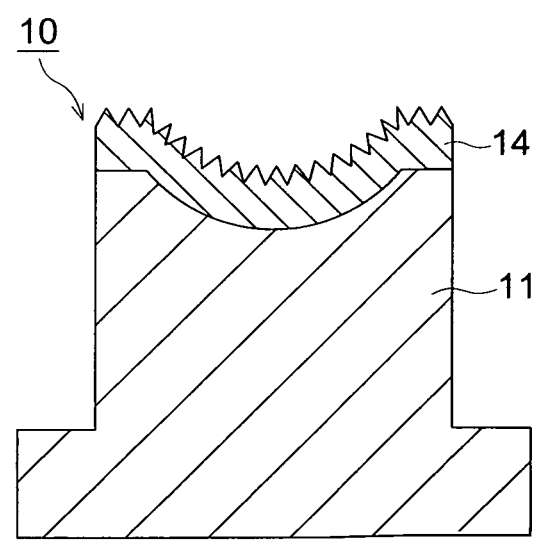
Figure 2:
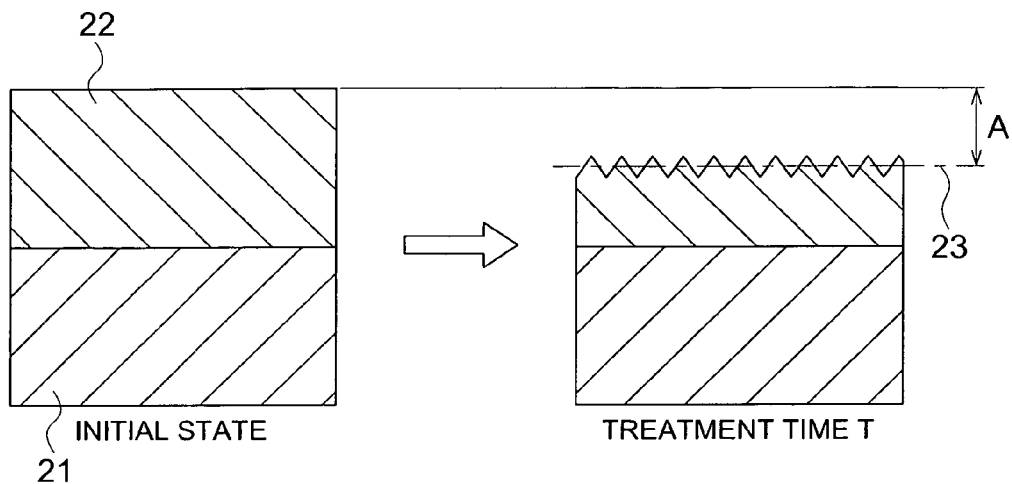
FIG. 2 shows a schematic diagram illustrating what an etching rate means.

First, the production method of the lower mold according to an embodiment of the invention is described referring to FIGS. 1*a* to 5. FIGS. 1*a* to 3*a* are diagrams showing the situation where the lower mold in each step, and FIG. 2 is a schematic diagram illustrating what an etching rate means. FIGS. 3*a* and 3*b* are diagram showing a method of wet etching. FIGS. 4*a* and 4*b* are diagrams showing methods of etching using a mask, and FIG. 5 is a diagram showing an example of a parallel plate type dry etching apparatus.

(Substrate)

A molding surface 15 having a predetermined shape is previously formed on the substrate 11 of the lower mold. In the invention, it is not necessary to roughen the surface of the substrate 11 because the roughening treatment is applied on the coating layer 14 formed on the substrate 11. Therefore, the material of the substrate can be selected without consideration to easiness of roughening and durability after the roughening.

Therefore, the material of the substrate 11 can be appropriately selected depending on the condition from the materials known as the material for the lower mold for receiving a molten glass droplet. Examples of preferably usable material include various kinds of heat resistive alloy such as stainless steel, ultra-hard material mainly constituted by tungsten carbide, various kinds of ceramics such as silicon carbide and silicon nitride and composite materials containing carbon. These materials may be provided thereon with a processed compact layer such as CVD silicon carbide layer.

Next, the coating layer 14 is formed on the substrate 14 (Layer forming step: FIG. 1*b*). The material of the coating layer is not specifically limited, for example, various metals (such as chromium, aluminum, and titanium), nitride (such as chromium nitride, aluminum nitride, titanium nitride and boron nitride), and oxide (such as chromium oxide, aluminum oxide and titanium oxide) are usable. Among them, the coating layer 14 preferably contains at least one of the elements: chromium; aluminum; and titanium. For example, metallic chromium, metallic aluminum, metallic titanium, and oxide or nitride of them, and a mixture of them are suitable.

Such layers are each can be easily formed and easily roughened by the later-mentioned predetermined etching method. The coating layer 14 containing at least one of chromium, aluminum and titanium has a common feature that the surface is oxidized by heating in the atmosphere and a stable layer of the oxide is formed. These oxides have a great advantage that the oxides do not easily react even when that is contacted with the high temperature molten glass droplet because the oxides are very low in the standard formation free energy (standard formation Gibb's energy) and considerably stable. Among them, oxide of chromium is particularly stable; therefore, it is preferable to provide the coating layer 14 containing chromium element.

The coating layer 14 has only to be thick enough for fine unevenness to be formed therein by the roughening by etching, and usually the thickness is preferably no less than 0.05 μm. To the contrary, if the coating layer 14 is excessively thick, a defect such as falling of layer may occur. Therefore, the thickness of the coating layer 14 is preferably from 0.05 μm to 5 μm and more preferably from 0.1 μm to 1 μm.

The coating layer may be constituted by a single layer or plural layers having different characteristics. For example, it is also preferred that the coating layer is separated into two layers (a lower layer and a surface layer) different in etching rate, and a layer having lower etching rate is formed on the substrate 11 as the lower layer, and then the a surface layer having a etching rate higher than that of the lower layer is provided.

When the above-mentioned configuration is taken, the etching rate of the surface layer existing as the uppermost layer has a large etching rate, thus, fine unevenness is easily formed thereon by etching, and thereby uniformly roughening the surface. Moreover, the adhesiveness of the coating layer 14 is improved, and the influence of the etching to the substrate can be surely prevented by the presence of the lower layer having lower etching rate under the surface layer. Thus the lower mold 10 excellent in the durability can be produced.

The meaning of etching rate in this specification is described referring to FIG. 2. The left diagram in FIG. 2 shows the initial state before etching, and a layer 22 is formed on the substrate 21. The right diagram in FIG. 2 displays the state after etching for a treatment time t. The etching rate is defined by the value of the etching amount A (the reducing amount of the thickness of the layer 22) divided by the treatment time t. The fine unevenness is formed on the surface by the etching and the average line 23 of the unevenness is used for calculating the etching rate.

The method for forming the coating layer 14 is not specifically limited, and a method appropriately selected from the known layer forming methods may be used. As the example of the method, a vacuum deposition method, sputtering method and CVD method can be cited. Among them, the sputtering method is preferred since the layer having high adhesiveness can be easily formed.

It has been found by the inventors that the etching rate is increased with decreasing of the energy of the sputtered particles arriving at the layer surface and decreased with increasing of the energy of the sputtered particles when the layer 14 containing chromium is formed by the sputtering method. Accordingly, the lower layer and the surface layer can be formed by firstly forming a layer under a condition in which the sputtering particles arriving at the layer surface have higher energy and then the layer forming condition is changed so that the energy of the sputtering particles have lower energy. By such method, the lower layer having lower etching rate and the surface layer having higher etching rate can be continuously formed by only changing the layer forming condition without changing of the material or the apparatus. The reason of making the coating layer 14 into a double layer constitution is that the etching is stopped even when the surface layer is excessively subjected to etching, and the adhesion between the substrate 11 and the coating layer 14 can be improved by the high energy formation of the lower layer.

To decrease the energy of the sputtered particles arriving at the deposition layer surface, cited are the following methods: the pressure of the sputtering gas is raised during the film formation; the distance between the target and the deposition layer surface is increased; and the electric power applied to the sputtering electrodes is lowered. In contrast, to increase the energy of the particles arriving at the deposition layer surface, cited are the following methods: the pressure of the sputtering gas is lowered during the film formation; the distance between the target and the deposition layer surface is shortened; and the electric power applying to the sputtering electrodes is raised.

(Roughening Step)

Next, roughening of the surface is performed (Surface roughening step: FIG. 1*c*). As above-mentioned, the surface of the coating layer 14 provided on the substrate 11 is roughened by a method such as etching. Therefore, the surface can be uniformly roughened so that the surface has predetermined roughness and deterioration of the surface can be reduced. The roughening is preferably performed by wet etching or dry etching because the certain degree of unevenness can be uniformly formed, although the method for roughening is not limited thereto.

It is found by the inventors that the uniform roughening of the coating layer containing the predetermined element can be carried out by etching by any one of the following methods (1) to (3):

(1) Wet etching using an acidic solution containing cerium (IV) ammonium nitrate;

(2) Wet etching using an alkaline solution containing potassium ferricyanide and potassium hydroxide; and (3) Dry etching using plasma.

Figure 3A:
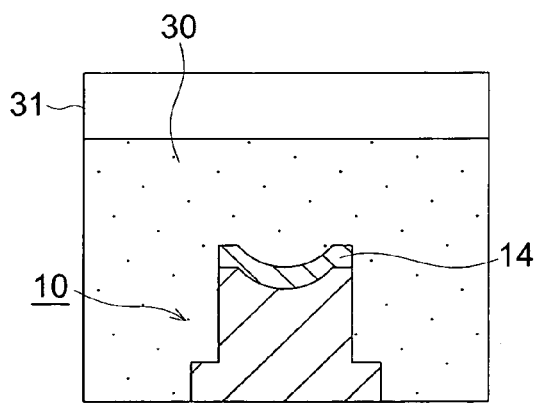
FIGS. 3*a*, 3*b*, 3*c*, and 3*d* are diagrams showing methods of etching.
Figure 3B:
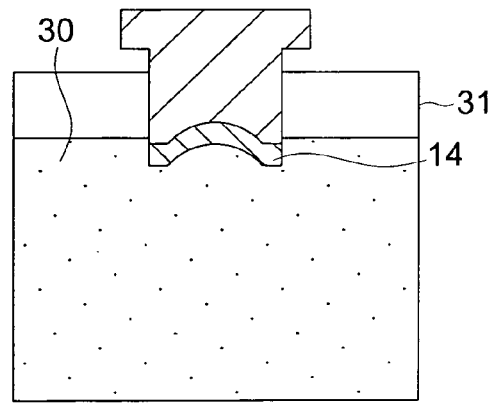
Figure 3C:
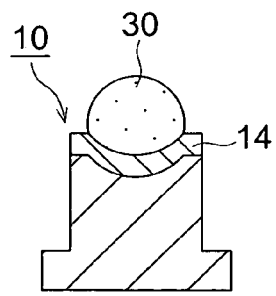
Figure 3D:
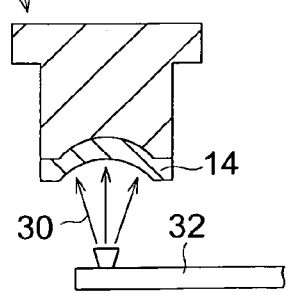

The wet etching methods of the above (1) and (2) are methods in which the roughening is carried out by contacting an etchant 30 to the coating layer 14 to let reaction occur. The lower mold 10 may be entirely immersed in the etchant 30 stored in an etchant tank 31 as shown in FIG. 3*a*, or the coating layer 14 is dipped in the etchant 30 as shown in FIG. 3*b*. Moreover, the etchant may be supplied onto the coating layer 14 as shown in FIG. 3*c*, or the etchant 30 may be sprayed through a spraying nozzle 32 to the coating layer 14 as shown in FIG. 4*d*.

When etching, it is not always necessary to roughen the entire surface of the coating layer 14 by etching, and the etching has to be performed at least in the area to be contacted with the molten glass droplet. It is also preferred to use a mask 33 as shown in FIGS. 4a and 4b to prevent deterioration of the substrate 11 caused by the etching and to roughen the predetermined area only.

By the method of the above 1 or 2, the treatment can be carried out with excellent uniformity at low cost without necessity of expensive and a large apparatus. For a stable treatment, it is preferable to keep constant the following conditions: the ambient temperature; illuminance of the treatment room; the temperature of the lower mold, the number of lower mold to be treated; the temperature, amount and concentration of the etchant; and so on. Alternatively, the depth and cycle of the unevenness to be formed can be suitably controlled by changing these conditions.

Even when normal acidic solution only containing an acid such as sulfuric acid, nitric acid and perchloric acid as the etchant, the coating layer 14 can be roughened. However, when the acidic solution of cerium(IV) ammonium nitrate ($(Ce(NH_4)_2(NO_3)_6)$) described in the above (1) is used, fine unevenness can be uniformly formed in shorter time on the coating layer 14 containing chromium element. The liquid may be a solution containing plural acids such as nitric acid and perchloric acid as long as the solution contains cerium (IV) ammonium nitrate. The concentration of cerium(IV) ammonium nitrate may be suitably selected so as to obtain desired treatment rate, and a concentration of from 5% to 50% by mass is usually preferred.

Even when a usual alkaline solution containing an alkali such as sodium hydroxide or potassium hydroxide is used as the etchant, the coating layer 14 can be roughened. However, when an alkaline solution containing potassium ferricyanide and potassium hydroxide described in the above (2) is used, fine unevenness can be uniformly formed in a shorter time on the coating layer 14 containing chromium element. As the alkaline solution containing potassium ferricyanide and potassium hydroxide, a mixture solution of potassium ferricyanide, potassium hydroxide and purified water can be used. The solution may contain another ingredient as long as it disturbs advantages of the invention. Regarding the ratio of potassium ferricyanide to potassium hydroxide, 0.2 to 5 parts by mass potassium hydroxide is preferable for 1 part by mass of potassium ferricyanide. The mixing amount of purified water is not specifically limited and may be suitably controlled so as to obtain desired treatment speed.

The dry etching using plasma described in the above (3) is a method in which the coating layer 14 is roughened by ion radical generated by plasma. The plasma is generated by high frequency wave supplied in a vacuum chamber in which etching gas is introduced. This method is called as plasma etching or reactive ion etching (RIE). Such a method is preferable since the method is not accompanied with formation of any waste liquid, and does not create any environmental load, contamination of the surface by a foreign material, and thus the repeatability of the treatment is high.

An apparatus for dry etching may be suitably selected from known ones such as a parallel plate type, a barrel (cylindrical) type, a magnetron type, and an ECR type, without any limitation. Here, a parallel plate type apparatus is described as an example.

A parallel plate type dry etching apparatus 40 shown in FIG. 5 has two electrodes 42 and 43 arranged in parallel in a vacuum chamber 41, and the electrode 42 is connected with a high frequency power source 44. The lower mold 10 to be treated is placed on the electrode 42, and then a valve 45 is opened so that the pressure in the chamber 41 is reduced to a high vacuum level of $10^{-3}$ Pa by an air displacement pump 46.

After that, the etching gas is introduced from a gas cylinder 48 through a flow amount controlling valve 47, and high frequency wave is applied to the electrode 42 so as to generate plasma between the electrodes 42 and 43. The fine unevenness is formed in the surface of the coating layer 14 by the ions and radicals formed by the plasma so that the surface is roughened.

The etching function of the dry etching process includes a physical function of collision of the ions and a chemical function of reaction with the radicals. In the invention, the roughing of surface may be carried out any one of such functions, and both functions may work simultaneously.

The etching gas may be inactive gas such as Ar or high reactive gas containing halogen such as F, Cl and Br. Among them, halogen-containing gas such as $CF_4$, $SF_6$, $CHF_3$, $Cl_2$, $BCl_3$, and HBr has high reactivity to the coating layer 14 containing chromium element, and treatment can be performed in a shorter time. Mixed gas composed of such gases and $O_2$ or $N_2$ is also usable.

It is preferable in any of the methods of (1) to (3) to perform the etching so that the arithmetic average roughness (Ra) of the surface is made not less than 0.01 μm and the average length of roughness curve element (RSm) is made not more than 0.5 μm. The occurrence of air retention on the produced glass gob or molded glass article can be more effectively prevented by making the arithmetic average roughness of the surface (Ra) and the average length of roughness curve element (RSm) to be within the above range.

The arithmetic average roughness of the surface (Ra) and the average length of roughness curve element (RSm) are the parameters defined in JIS B 0601:2001. These parameters are determined with a measuring apparatus having a spatial resolution of not more than 0.1 μm such as an atomic force microscope (AFM). Usual stylus touching type roughness meter is not preferred since the curvature radius of the stylus point of several microns is too large.

The reason why the unevenness on the coating layer 14 created by etching can prevent occurrence of air retention in a glass gob or molded glass article is described below referring to FIGS. 6a to 7c.

Figure 6A:
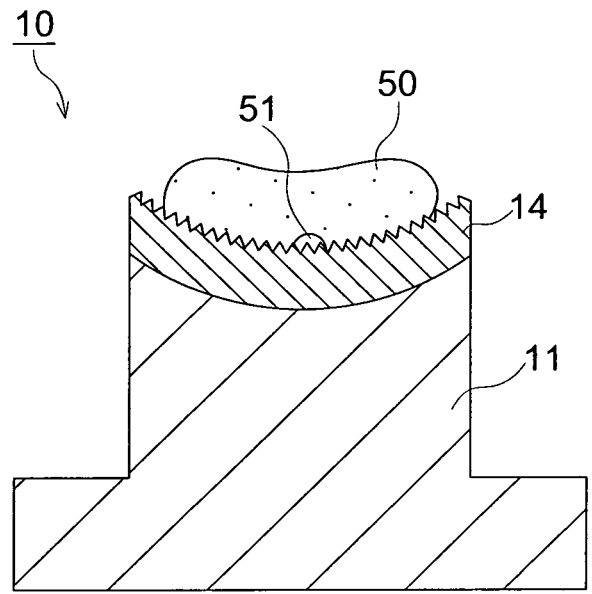
FIGS. 6*a* and 6*b* are diagrams showing the situations where the molten glass droplet 50 dropped on the lower mold 10.
Figure 6B:
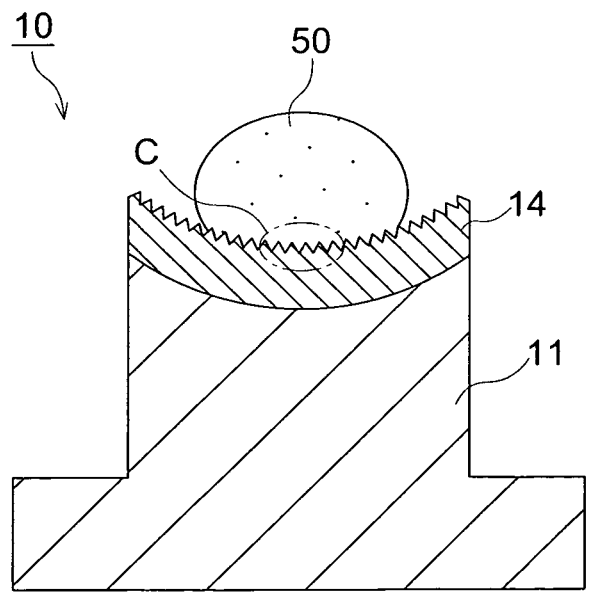

FIGS. 6a and 6b illustrate the state of the glass droplet 50 dropped on the lower mold. FIG. 6a shows the state at the moment of colliding of the molten glass droplet 50 to the lower mold 10, and FIG. 6b shows the state when the molten glass droplet then gets rounded by a surface tension.

As is shown in FIG. 6a, the molten glass droplet 50 is flatly extended by the impact of collision at the moment of collision to the lower mold 10. At this time, a small dent 51 of from several ten microns to several hundred microns is formed near the central portion of the bottom surface (the surface contacting with the coating layer 14). The mechanism of the occurrence of the dent is not always clear, but according to the analysis using simulation it is presumed as follows: when the molten glass droplet 50 collides with the lower mold 10, the glass of the portion that first collides with the lower mold 10 bounces back upward, thereby forming the dent 51.

After that, the molten glass droplet 50 is deformed to a spherical shape by the action of surface tension. On this occasion, the bottom surface of the molten glass droplet 50 is closely contacted with the coating layer 14 and air remaining in the dent 51 losses the escaping rout so that the dent 51 cannot disappear and remains as the air retention when the surface of the coating layer 14 is not roughened.

However, the coating layer 14 of the lower mold 10 in the embodiment of the invention is roughened by etching after formation of the coating layer 14. Therefore, a space is formed between the bottom surface of the molten glass droplet and the coating layer, and air remaining in the dent 51 escapes through the space on the occasion of deformation to a sphere shape of the molten glass droplet 50 by surface tension, whereby the dent 51 disappears.

Figure 7A:
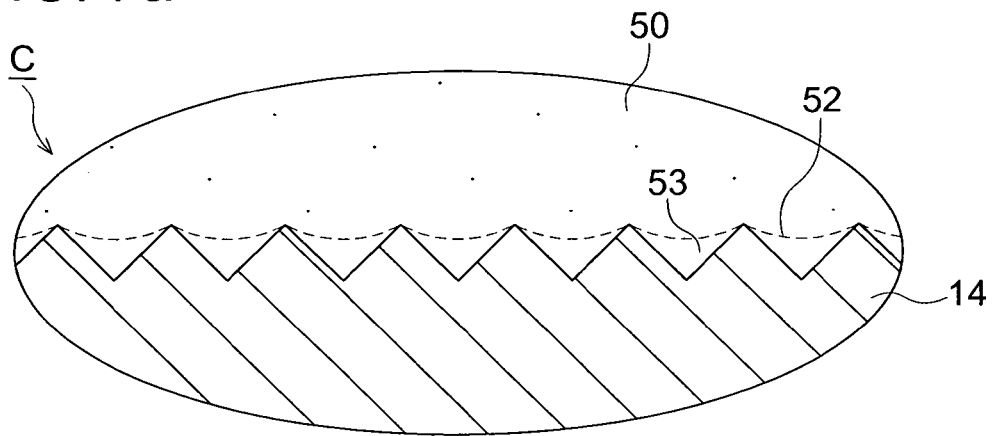
FIGS. 7*a*, 7*b*, and 7*c* are schematic diagrams showing the detail of portions C in FIG. 6*b*.
Figure 7B:
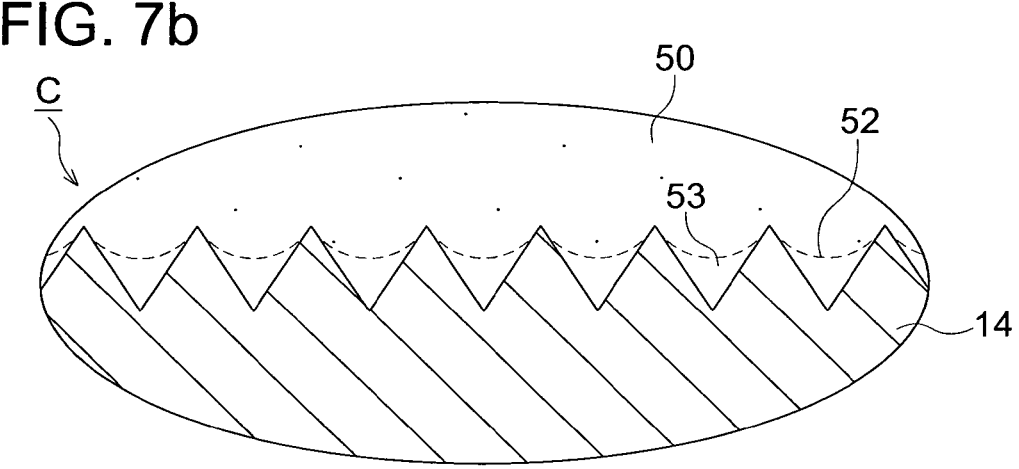
Figure 7C:
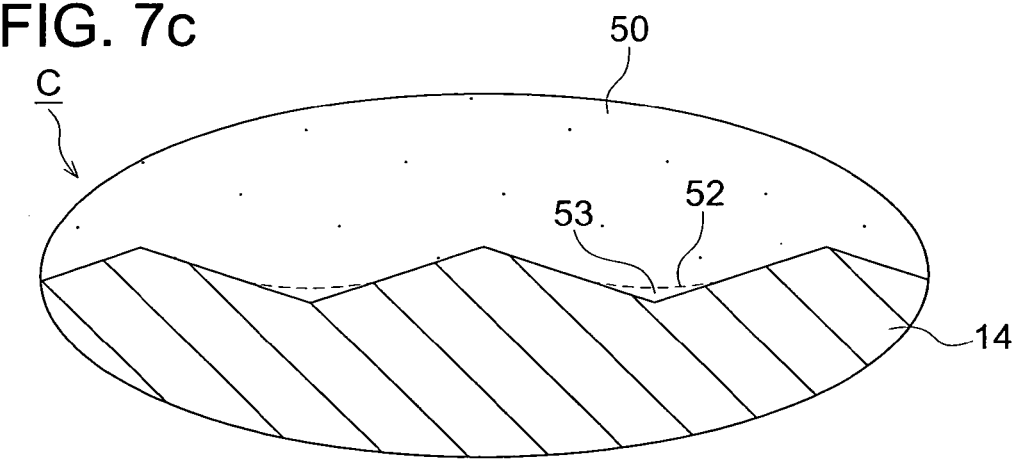

The state of the space formed between the bottom surface of the molten glass droplet 50 and the coating layer 14 is described in detail referring FIGS. 7a to 7c. FIGS. 7a to 7c are schematic diagrams minutely illustrating the portion C of FIG. 6b. As is shown in FIG. 7a, the unevenness is formed by etching on the surface of the coating layer 14. The bottom surface of the dropped molten glass droplet 50 is not completely entered into the depressed portion of the unevenness, thereby remaining spaces 53. The spaces 53 constitute the escape rout for the air remaining in the dent 51, and the dent 51 thus disappears.

FIG. 7b displays a state in which the height of unevenness of the coating layer 14 is higher than that shown in FIG. 7a, but the cycle is the same. When the height of the unevenness is as high as that, the surface roughness of the produced glass gob or molded glass article may be excessively large even though the sufficient size of the space 53 is formed and the dent 51 is easily removed. In contrast, when the height of the unevenness of the coating layer is too low, the glass is get into greater part of the depressed portion, and sufficient size of space 53 is not formed with result that the dent may remain without completely disappearing. Therefore, the arithmetic average roughness of the surface (Ra) of the surface of the coating layer 14 is preferably not less than 0.01 μm, and more preferably from 0.01 μm to 0.2 μm.

The cycle of the unevenness also influences the occurrence of the air retention. FIG. 7c shows a case in which the cycle of unevenness is larger than that in FIG. 7a, but the height of the unevenness is the same. When the cycle of unevenness is larger, the glass is easily get near the bottom of the depressed portion; therefore, the space 53 having sufficient size is not formed and the dent 51 may remain. Accordingly, the average length of roughness curve element (RSm) is preferably not more than 0.5 μm.

The coating layer may have a multi-layered structure composed of two or more layers. For example, an intermediate layer for improving the adhesion between the substrate 11 and the coating layer 14 may be provided, and a protection layer for protecting the surface may be further provided on the coating layer 14 on which the unevenness is formed by a roughening treatment. When the coating layer 14 is composed of two or more layers, it is preferred that the arithmetic average surface roughness (Ra) and the average length of roughness curve element (RSm) are within the above predetermined range.

(Production Method of Glass Gob)

The production method of glass gob of the invention is described below referring to FIGS. 8 to 10. FIG. 8 is a flowchart illustrating an example of the production method of glass gob. FIGS. 9 and 10 are schematic diagrams for illustrating the glass gob production method in an embodiment of the invention. FIG. 9 shows a state in the step (S22) for dropping a molten glass droplet onto a lower mold, and FIG. 10 shows a state in the step (S23) for cooling and solidifying the dropped molten glass droplet on the lower mold.

As mentioned above, the lower mold is constituted by the coating layer 14 provided on the substrate 11, and the surface of the coating layer 14 was roughened by etching of a predetermined method.

The lower mold 10 is configured so as to be heated to a predetermined temperature by a heating means which is not shown in the drawing. The heating means can be suitably selected from known heating means. For example, a cartridge heater to be built in the interior of lower mold 10, a sheet-shaped heater to be contacted to the outside of the lower mold 10, an infrared heating device and a high frequency induction heating device are usable.

The processes are each successively described below according to the flowchart shown in FIG. 8.

First, the lower mold is heated at a predetermined temperature (Process S21) in advance. When the temperature of the lower mold 10 is excessively low, large wrinkles occur at the bottom surface (the surface touching to the lower mold 10) of the glass gob, and cracks or micro cracks can be created by rapid cooling. In contrast, when the temperature is excessively high, not only probability of adhesion between the glass and the lower mold 10 or shortening of the life time of the lower mold is caused but also an air retention on the glass gob can remain due to the close contact between the glass and the lower mold 10. The suitable temperature is practically influenced by various conditions such as the kind, shape and size of the glass, the material and size of the metal mold, and the position of the heater and thermo sensor, therefore it is preferable to previously decide the suitable temperature by experiments. Usually, the temperature is preferably set within the range of from Tg−100° C. to Tg+100° C., where Tg is a glass transition point of glass.

Next is a step for dropping the molten glass droplet 50 onto the lower mold 10 (Step S22). A melting tank 62 is heated by a heater, not shown in the drawing, in which molten glass 61 is stored. A nozzle 63 is provided at the bottom of the melting tank 62, and the molten glass 61 is passed through the flowing rout provided in the nozzle 63 by its weight and accumulated at the end of the nozzle by surface tension. When certain amount of the molten glass is accumulated at the end of the nozzle 63, the molten glass is naturally released from the end of the nozzle 63, and the predetermined amount of the glass droplet 50 is dropped downward (see FIG. 9).

The weight of the molten glass droplet to be released can be usually controlled by the outer diameter of the nozzle 63, and the glass droplet having a weight of about 0.1 g to 2 g can be dropped although the amount is depended on the kind of glass. Moreover, the interval of dropping of the molten glass droplet can be controlled by controlling the inner diameter or length of the nozzle 63, or the heating temperature. Consequently, the molten glass droplet having a desired weight can be dropped at a desired interval by suitably controlling these conditions.

The kind of glass to be used is not specifically limited and may be suitably selected in response to the use. For example, an optical glass such as borate-silicate glass, silicate glass, phosphate glass and lanthanum glass can be cited.

The molten glass droplet dropping from the nozzle is collided with a member having a fine through hole instead of directly dropped onto the lower mold from the nozzle, so that a part of the molten glass droplet is passed through the fine through hole and dropped as a fine drop. Smaller glass gobs can be produced by such a process. This method is described in detail in Japanese Patent Laid-Open Publication 2002-154834.

Next step is a step for cooling and solidifying the molted glass droplet 50 dropped on the lower mold 10 (Step S23) (see FIG. 10). The molten glass droplet 50 is cooled and solidified with heat being transferred to the lower mold 10 and surrounding air while standing for a certain duration on the lower mold 10. No air retention is formed on the solidified glass gob 54 since the specified roughening treatment is subjected to the surface of the coating layer.

After that, the solidified glass gob 54 is collected (Step S24). Thus, the production of the glass gob is completed. The collection of the glass gob can be carried out by using a known collection device utilizing vacuum suction, for example. Successive production of the glass gob can be performed by repeating the steps from Step S22.

The glass gobs can be used for production of various kinds of high-precision optical elements produced by the re-heat press method.

(Production Method of Molded Glass Article)

Figure 11:
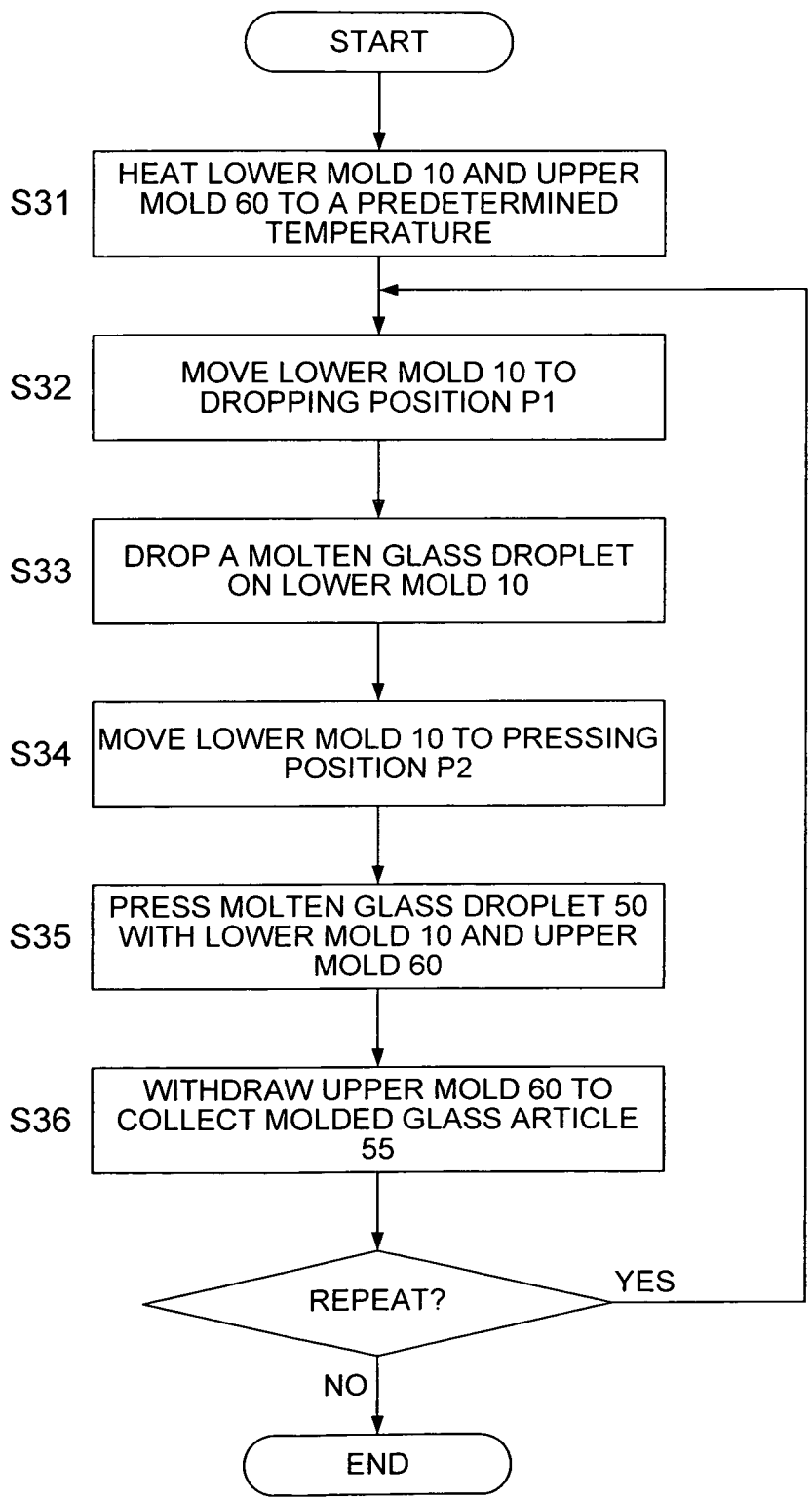
FIG. 11 is a flowchart of an example of a production method of a molded glass article.
Figure 12:
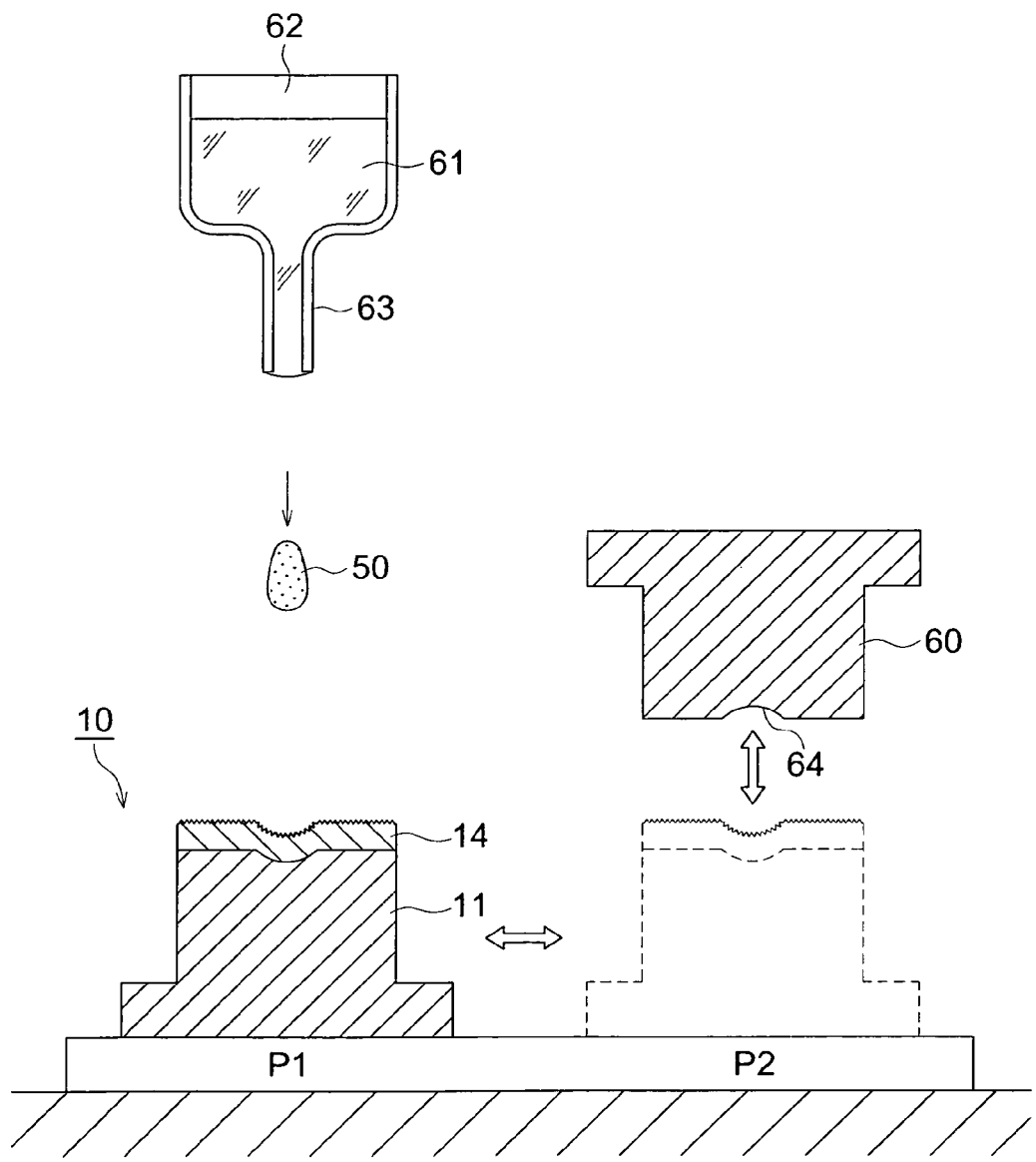
FIG. 12 is a diagram showing a step (S33) for dropping a glass droplet onto the lower mold.
Figure 13:
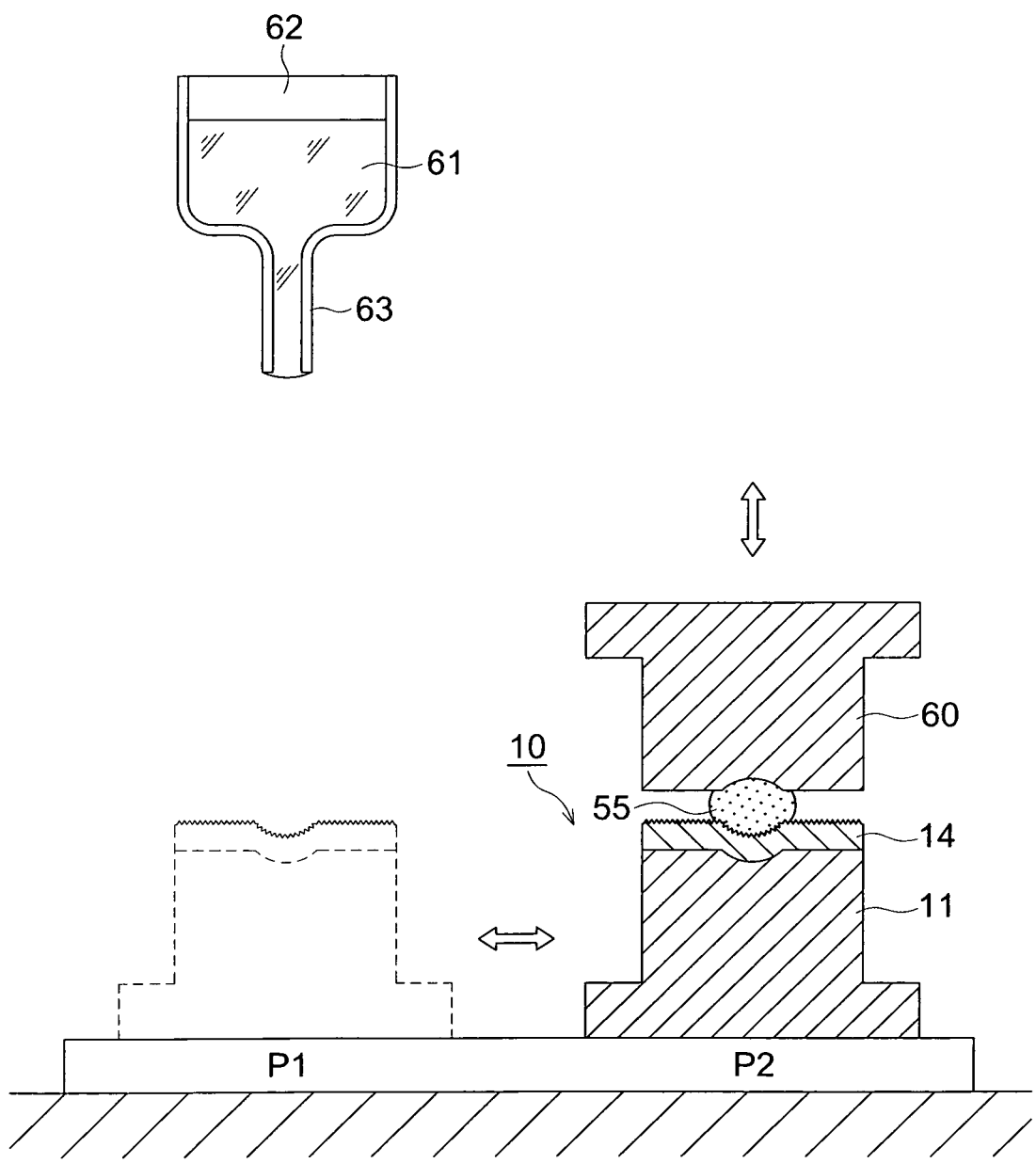
FIG. 13 is a diagram showing a step (S35) for pressing the dropped glass droplet by the lower mold and the upper mold.

The production method of molded glass articles of the invention is described below referring to FIGS. 11 to 13. FIG. 11 is a flowchart illustrating an example of a production method of molded glass article. FIGS. 12 and 13 are schematic diagrams describing the molded glass article production method in an embodiment of the invention. FIG. 12 shows a state in the step (S33) for dropping the molten glass droplet onto the lower mold, and FIG. 13 shows a state in the step (S35) for pressing the dropped molten glass droplet on the lower mold with the upper mold and the lower mold.

The lower mold 10 is the same as that described in FIGS. 9 and 10. The upper mold is composed of the same material as the substrate 11 of the lower mold 10, and has a molding surface 64 for pressing the molted glass droplet 50. It should be noted that unlike the lower mold 10, the coating layer and the roughening treatment thereto are not necessary for the molding surface 64.

The lower mold 10 is configured so that the lower mold 10 can be moved between the position (propping position P1) for receiving the molten glass droplet 50 under the nozzle 63 and the position (Pressing position P2) for pressing the molten glass droplet 50 by facing to the upper mold 60 by a driving means not shown in the drawing. The upper mold 60 is configured so that the upper mold 60 can be moved in the direction for pressing the molten glass droplet (up and down direction in the drawing) by a driving means not shown in the drawing.

The steps are each successively described below according to the flowchart shown in FIG. 11.

First, the lower mold 10 and the upper mold 60 are heated at a predetermined temperature (Step S31) in advance. The lower mold 10 and the upper mold 60 are configured so that they are heated at the predetermined temperature by a heating means, which is not shown in the drawing. The lower mold 10 and the upper mold 60 are preferably configured so that the temperatures of them are each independently controlled. The predetermined temperature is the same as that in the above-mentioned Step S21 of the production method of glass gob, and may be suitably selected for forming suitable transferred surface on the molded glass article produced by the press-molding. The temperature of the lower mold 10 and that of the upper mold 60 may be the same or different.

Next, the lower mold 10 is moved to the dropping position P1 (Step S32), and the molten glass droplet 50 is dropped from the nozzle 63 (Step S33) (see. FIG. 12) The conditions on the occasion of the dropping of the molten glass droplet 50 are the same as those in the case of Step S22 for producing the glass gob.

Then the lower mold is moved to the pressing position P2 (Step S34), and the upper mole 60 is moved downward to press the molten glass droplet 50 with the lower mold 10 and the upper mold 60 (Process S35); cf. FIG. 13.

The molten glass droplet 50 is cooled and solidified with heat being transferred through the surfaces contacting with the lower mold 10 and the upper mold 60 while being pressed. The pressing is released after the molten glass droplet 50 is cooled to a temperature at which the transferred surface formed on the molded glass article is not deformed even when the pressure is released. It is usually suitable that the temperature is lowered to a temperature near the Tg of the glass although the temperature is also depending on the kind of glass, the size, shape and the precision required for the molded glass article.

The load applied to press the molten glass droplet 50 may be constant or changed with time. The amount of the load may be suitably decided depending on the size of the molded glass article to be produced. The driving means for moving the upper mold in the vertical direction is not specifically limited, and may be suitably selected from known driving means such as an air cylinder, oil pressure cylinder and servo motor.

After that, the upper mold 60 is released, being moved upward, and the solidified molded glass article 55 is collected (Step S36) to complete the production of molded glass article. No air retention is formed on the obtained molded glass article since the surface of the coating layer 14 of the lower mold 10 is roughened. When the production of the molded glass article is continued, the lower mold 10 is returned again to the dropping position P1 (Step S32) and the succeeding Steps are repeated.

The production method of molded glass article of the invention may include a step other than the above-described. For example, a step for examining the shape of the molded glass article before the collection of the molded glass article, and a step for cleaning the lower mold 10 and the upper mold 60 may be provided.

The molded glass articles produced by the production method of the invention can be used as various kinds of optical elements such as an image taking lens for a digital camera, an optical pickup lens for DVD and a coupling lens for optical communication. The molded glass article may be re-heated and subjected to press-molding by the heat press method to produce various kinds of optical elements.

EXAMPLES

Examples carried out to confirm the effects of the invention are described below, although the invention is not limited thereto.

Lower Mold

Example 1

A lower mold 10 was prepared according to the steps described in FIG. 1. The shape of the substrate 11 was cylinder having a diameter of 20 mm and a height of 20 mm, and the material was an ultra hard material mainly composed of tungsten carbide WC. A Cr layer having a thickness of 1 μm was formed as the coating layer 14 on the surface of the substrate 11 by a sputtering method.

Then a wet roughening treatment of the surface of the coating layer 14 was performed by immersing the lower mold 10 into etchant 30. On this occasion, a mask 33 was used as shown in FIG. 4a so that the substrate 11 is not directly influenced by the etching. As the etchant 30, an acidic solution containing cerium(IV) ammonium nitrate (ECR-2, manufactured by Nacalai Tesque Inc.) was used. Five lower molds 10 were simultaneously immersed into 500 ml of the etchant 30. The temperature of the lower molds 10 and the etchant was 30° C. and the treating time was 5 minutes. In the treatment room, the ambient temperature was 25° C. and the illuminance was 1,000 Lux.

On the coating layer 14 after being etched, the arithmetic average surface roughness (Ra) was 0.2 μm and the average length of roughness curve element (RSm) was 0.05 μm. The arithmetic average surface roughness (Ra) and the average length of roughness curve element (RSm) were measured by AFM (D3100, manufactured by Digital Instruments).

Lower Mold

Example 2

A lower mold was prepared by using the same substrate 11 as in Example 1, and subjected to the layer forming step and the roughening step similar to those in Example 1, except that the etchant was replaced by an alkaline mixture liquid A composed of 100 g of potassium ferricyanide, 100 g of potassium hydroxide and 1 L of purified water and the treating time was changed to 20 minutes. On the coating layer 14 after being etched, the arithmetic average surface roughness (Ra) was 0.01 μm and the average length of roughness curve element (RSm) was 0.03 μm.

Lower Mold

Example 3

The same substrate as that in Examples 1 and 2 was used and a Cr layer having a thickness of 1 μm was formed thereon under the similar condition in Examples 1 and 2.

The roughening step was carried out by a dry etching using the parallel plate type dry etching apparatus 40 shown in FIG. 5. The lower mold 10 was placed on the electrode 42 and then high vacuum condition of $10^{-3}$ Pa level was made in the vacuum chamber 41 by evacuating air by the air displacement pump 46 taking about 1 hour. After that, a mixture gas of $Cl_2$ and $O_2$ was introduced into the vacuum chamber 41 and the flowing amount of the mixture gas controlled so as to keep the pressure in the vacuum chamber 41 at 0.5 Pa. The mixing ratio of $Cl_2$ to $O_2$ was 7:3 by volume. To the electrode 42, 500 W of high frequency wave was applied to generate plasma between the electrodes 42 and 43, and etching was performed for 10 minutes. It was considered that the etching was progressed on the outermost surface of the coating layer 14 on this occasion while forming $CrO_2Cl_2$ by the reaction between the plasma and Cr of the coating layer 14. The arithmetic average surface roughness (Ra) and the average length of roughness curve element (RSm) of the surface of the coating layer 14 were each 0.1 μm and 0.25 μm.

The preparation conditions and the measurement results are listed in Table 1.

TABLE 1

|  | Example 1 | Example 2 | Example 3 |
|---|---|---|---|
| Substrate | WC | WC | WC |
| Surface layer material (Thickness) | Cr (1 μm) | Cr (1 μm) | Cr (1 μm) |
| Etching method | Wet | Wet | Dry |
| Etchant | ECR-2 | Mixture liquid A | — |
| Etching gas | — | — | $Cl_2 + O_2$ |
| Ra (μm) | 0.2 | 0.01 | 0.1 |
| RSm (μm) | 0.5 | 0.03 | 0.25 |
| Air retention | B | B | B |

(Preparation of Molded Glass Article)

Molded glass articles were prepared according to the flowchart shown in FIG. 11 using the lower molds prepared in Examples 1 to 3. Phosphoric acid type glass having a Tg of 480° C. was used as the glass material. The heating temperatures of the lower mold and the upper mold in Step S31 were each 500° C. and 450° C. The temperature near the end of the nozzle 63 was 1000° C., and the conditions were set so that the molten glass droplet having a weight of about 190 mg was dropped. The load for pressing was 1,800 N.

Presence of the air retention was evaluated by microscopic observation of the molded glass articles prepared by each of the lower molds. The sample prepared by the 1,000[th] shot was subjected to the evaluation, and the sample without any air retention was ranked "good (B)". The evaluation results are also listed in Table 1.

In any case of each of Examples 1 to 3, no air retention was formed on the molded glass article prepared by the 1,000[th] shot. This result confirmed that the advantages of the invention worked effectively.

Examples 4 to 7

Molded glass articles were prepared according to the flowchart shown in FIG. 12.

First, the lower mold 10 and the upper mold 60 were prepared. As the material of the lower mold 10 and the upper mold 60, the ultra hard material mainly composed of tungsten carbide was used. The outer diameter of the molded glass article was 7 mm and the objective thickness at the central portion was 3.5 mm.

The coating layer 14 of the lower mold 10 was a metallic chromium layer. The metallic chromium layer was formed by a sputtering method and the thickness thereof was 0.5 μm. After formation of the layer, the surface of the coating layer was roughened by immersing it in etchant. As the etchant, a chromium etchant available on the market containing cerium (IV) ammonium nitrate (ECR-2, manufactured by Nacalai Tesque Inc.) was used.

Four kinds of lower molds were prepared by controlling the etching time, which lower molds each have arithmetic average surface roughness's (Ra) of 0.001 μm (example 4), 0.1 μm (Example 5), 0.2 μm (Example 6) and 0.25 μm (Example 7) and the average lengths of roughness curve element (RSm) of 0.03 μm (example 4), 0.25 μm (Example 5), 0.4 μm (Example 6) and 0.5 μm (Example 7). The arithmetic average surface roughness's (Ra) and the average lengths of roughness curve element (RSm) were measured by the AFM (D3100, manufactured by Digital Instruments).

Molded glass articles were prepared using these four kinds of lower molds 10 according to the flowchart shown in FIG. 12. Phosphoric acid type glass having a Tg of 480° C. was used as the glass material. The heating temperature in Step S31 of the lower mold and the upper mold were each 500° C. and 450° C. The temperature near the end of the nozzle 63 was 1000° C., and the conditions were set so that the molten glass droplet having a weight of about 190 mg was dropped. The load for pressing was 1,800 N.

The presence of the air retention on each of molded glass articles prepared by each of the lower molds 10 was evaluated by microscopic observation. Moreover, the arithmetic average surface roughness (Ra) of the bottom surface (the surface formed in contact with the lower mold 10) was measured. The arithmetic average surface roughness (Ra) of the bottom surface of the molded glass article was ranked as follows:

Not more than 0.1 μm: Excellent (A)
More than 0.1 μm and not more than 0.15 μm: Good (B)
More than 0.15 μm: normal (C)

The molded glass articles were generally evaluated according to the evaluation of air retention and that of the arithmetic average surface roughness (Ra) of the bottom surface. Ranking of the general evaluation was as follows:

A: No air retention was observed and Evaluation of Ra was A.
B: No air retention was observed and Evaluation of Ra was B.
C: Air retention was observed.
The evaluation results are listed in Table 2.

TABLE 2

|  | Coating layer 14 | | Air retention | Molded glass article | |
|---|---|---|---|---|---|
|  | Ra (μm) | RSm (μm) |  | Ra of bottom surface | Overall evaluation |
| Example 4 | 0.01 | 0.03 | None | A | A |
| Example 5 | 0.1 | 0.25 | None | A | A |
| Example 6 | 0.2 | 0.4 | None | A | A |
| Example 7 | 0.25 | 0.5 | None | B | B |

In any case of Examples 4 to 7, air retention is not formed and the overall evaluation was A or B, so it was confirmed that the advantages of the invention worked effectively. It is further confirmed that when the arithmetic average roughness (Ra) of the coating layer 14 was not more than 0.2 μm (Examples 4 to 6), the arithmetic average surface roughness (Ra) of the bottom surface of the molded glass article was not more than 0.1 μm, and whereby the results of the general evaluation was excellent A.

The invention claimed is:

1. A method for manufacturing a lower mold for receiving a dropping molten glass droplet, the method comprising:
   depositing a coating layer on a substrate by a sputtering method, the coating layer comprising a lower layer and a surface layer, wherein the coating layer comprises chromium, and wherein the depositing comprises:
      sputtering a target comprising chromium under first layer forming conditions to deposit the lower layer on the substrate; and
      sputtering the target to deposit the surface layer on the lower layer under second layer forming conditions under which energy of sputtered particles arriving at a surface under deposition is lower than under the first layer forming conditions, so that an etching rate of the surface layer is larger than an etching rate of the lower layer; and
   roughening a surface of the coating layer by etching to make a roughened surface.

2. The method for manufacturing a lower mold of claim 1, wherein the etching is wet etching using acidic solution containing cerium (IV) ammonium nitrate.

3. The method for manufacturing a lower mold of claim 1, wherein the etching is wet etching using alkaline solution containing potassium ferricyanide and potassium hydrate.

4. The method for manufacturing a lower mold of claim 1, wherein the etching is dry etching using plasma.

5. The method for manufacturing a lower mold of claim 1, wherein the roughened surface of the coating layer has an arithmetic average roughness Ra of 0.01 μm or more and an average length of roughness curve element RSm of 0.5 μm or less.

6. The method for manufacturing a lower mold of claim 5, wherein the arithmetic average roughness Ra of the roughened surface of the coating layer is 0.2 μm or less.

7. The method for manufacturing a lower mold of claim 1, wherein a pressure of a sputtering gas used in sputtering the target under the first layer forming conditions is lower than a pressure of a sputtering gas used in sputtering the target under the second layer forming conditions.

8. A method for manufacturing a lower mold for receiving a dropping molten glass droplet, the method comprising:
   depositing a coating layer on a substrate by a sputtering method, the coating layer comprising a lower layer and a surface layer, wherein the depositing comprises:
      sputtering a target comprising chromium under first layer forming conditions to deposit the lower layer on the substrate; and
      sputtering the target to deposit the surface layer on the lower layer under second layer forming conditions under which energy of sputtered particles arriving at a surface under deposition is lower than under the first layer forming conditions, so that an etching rate of the surface layer is larger than an etching rate of the lower layer; and
   roughening a surface of the coating layer to make a roughened surface, wherein the roughened surface of the coating layer has an arithmetic average roughness Ra of 0.01 μm or more and an average length of roughness curve element RSm of 0.5 μm or less.

9. The method for manufacturing a lower mold of claim 8, wherein the arithmetic average roughness Ra of the roughened surface of the coating layer is 0.2 μm or less.

10. The method for manufacturing a lower mold of claim 8, wherein a pressure of a sputtering gas used in sputtering the target under the first layer forming conditions is lower than a pressure of a sputtering gas used in sputtering the target under the second layer forming conditions.

11. A method for manufacturing a glass gob, the method comprising:
   dropping a molten glass droplet on a lower mold; and
   cooling and solidifying the dropped molten glass droplet on the lower mold, wherein the lower mold is manufactured by the method comprising:
      depositing a coating layer on a substrate by a sputtering method, the coating layer comprising a lower layer and a surface layer, wherein the coating layer comprises chromium, and wherein the depositing comprises:
         sputtering a target comprising chromium under first layer forming conditions to deposit the lower layer on the substrate; and
         sputtering the target to deposit the surface layer on the lower layer under second layer forming conditions under which energy of sputtered particles arriving at a surface under deposition is lower than under the first layer forming conditions, so that an etching rate of the surface layer is larger than an etching rate of the lower layer; and
      roughening a surface of the coating layer by etching to make a roughened surface.

12. A method for manufacturing a molded glass article, the method comprising:
   dropping a molten glass droplet on a lower mold; and
   press-molding the dropped molten glass droplet by using the lower mold and an upper mold facing the lower mold, wherein the lower mold is manufactured by the method comprising:
      depositing a coating layer on a substrate by a sputtering method, the coating layer comprising a lower layer and a surface layer, wherein the coating layer comprises chromium, wherein the depositing comprises:
         sputtering a target comprising chromium under first layer forming conditions to deposit the lower layer on the substrate; and
         sputtering the target to deposit the surface layer on the lower layer under second layer forming conditions under which energy of sputtered particles arriving at a surface under deposition is lower than under the first layer forming conditions, so that an etching rate of the surface layer is larger than an etching rate of the lower layer; and roughening a surface of the coating layer by etching to make a roughened surface.

* * * * *